(12) United States Patent
Graf

(10) Patent No.: US 9,041,244 B2
(45) Date of Patent: May 26, 2015

(54) ON-BOARD POWER SUPPLY PROTECTION

(75) Inventor: Alfons Graf, Kaufering (DE)

(73) Assignee: Infineon Technologies AG, Neubiberg (DE)

( * ) Notice: Subject to any disclaimer, the term of this patent is extended or adjusted under 35 U.S.C. 154(b) by 499 days.

(21) Appl. No.: 12/982,613

(22) Filed: Dec. 30, 2010

(65) Prior Publication Data

US 2012/0169116 A1 Jul. 5, 2012

(51) Int. Cl.
*H02H 7/18* (2006.01)
*H02J 7/00* (2006.01)
*B60R 16/03* (2006.01)

(52) U.S. Cl.
CPC .............. *H02J 7/0034* (2013.01); *B60R 16/03* (2013.01)

(58) Field of Classification Search
USPC ........................................................ 307/10.7
See application file for complete search history.

(56) References Cited

U.S. PATENT DOCUMENTS

| | | | |
|---|---|---|---|
| 5,539,610 A * | 7/1996 | Williams et al. ............... 361/246 |
| 5,789,900 A * | 8/1998 | Hasegawa et al. ............. 320/132 |
| 6,239,515 B1 * | 5/2001 | Mackel et al. ................. 307/127 |
| 6,583,601 B2 * | 6/2003 | Simoes et al. ................. 320/114 |
| 2007/0210759 A1 * | 9/2007 | Sano et al. ..................... 320/134 |
| 2007/0272945 A1 * | 11/2007 | Matsuo et al. ................. 257/194 |
| 2009/0168276 A1 * | 7/2009 | Chen et al. ....................... 361/33 |
| 2009/0184578 A1 * | 7/2009 | Owens .......................... 307/10.7 |
| 2010/0237829 A1 * | 9/2010 | Tatebayashi et al. .......... 320/118 |
| 2011/0193409 A1 * | 8/2011 | Hara et al. .................... 307/10.1 |

FOREIGN PATENT DOCUMENTS

CN 201312124 Y 9/2009

* cited by examiner

*Primary Examiner* — Jared Fureman
*Assistant Examiner* — Duc M Pham
(74) *Attorney, Agent, or Firm* — Slater & Matsil, L.L.P.

(57) ABSTRACT

The system includes a first and a second power supply terminal configured to have at least one of a battery and a generator connected thereto, a first external terminal coupled to the first power supply terminal, and a second external terminal coupled to the second power supply terminal, and a protection unit connected between the first external terminal and the first power supply terminal. The protection unit includes a semiconductor switching unit having a load path and a control terminal, the load path connected between the first external terminal and the first power supply terminal, and a control circuit coupled to the control terminal of the semiconductor switching unit and configured to switch the switching unit on and off dependent on at least one electrical parameter in the on-board power supply system.

31 Claims, 5 Drawing Sheets

ON-BOARD POWER SUPPLY PROTECTION

TECHNICAL FIELD

Embodiments of the present invention relate to an on-board power supply system, and in particular to the reverse polarity protection of an on-board power supply system.

BACKGROUND

Automotive on-board power supply systems usually include a battery and a generator. A plurality of electrical loads may be coupled to the on-board power supply system. These loads can include a starter, electrical motors, and lights, as well as control and driver units for driving the individual loads. Most of the electrical loads connected to an on-board power supply system require a supply voltage with a given polarity and must not have the polarity of their supply voltage reversed. Each of these loads may include a reverse polarity protection circuit or element, like a diode. This, however, increases the costs of the overall system.

While in modern cars it is almost impossible to connect the car battery with a reverse polarity in the on-board power supply system, a reverse polarity error may occur when the on-board system is connected to an external power source, like a battery charger or the battery of another car. Connecting the battery to an external source can be required for charging the battery or for jump-start purposes. In modern cars, terminals for connecting an external power source are located remote from the battery and are connected to the on-board systems through electrically connecting wires. These terminals are also known as jump-start terminals or assist start terminals.

Although these terminals are labeled in a manner which should prevent a reverse polarization, errors may occur.

SUMMARY OF THE INVENTION

A first aspect relates to an on-board power supply system. The system includes a first and a second power supply terminal configured to have at least one of a battery and a generator connected thereto, a first external terminal coupled to the first power supply terminal, and a second external terminal coupled to the second power supply terminal, and a protection unit connected between the first external terminal and the first power supply terminal. The protection unit includes a semiconductor switching unit having a load path and a control terminal, the load path connected between the first external terminal and the first power supply terminal, and a control circuit coupled to the control terminal of the semiconductor switching unit and configured to switch the switching unit on and off dependent on at least one electrical parameter in the on-board power supply system.

A second aspect relates to a method for protecting an on-board power supply system. The power supply system includes a first and a second power supply terminal configured to have at least one of a battery and a generator connected thereto, and a first external terminal coupled to the first power supply terminal, and a second external terminal coupled to the second power supply terminal. The method includes connecting a protection unit with a semiconductor switching unit between the first external terminal and the first power supply terminal, and switching the switching unit on and off dependent on at least one electrical parameter in the on-board power supply system.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF ILLUSTRATIVE EMBODIMENTS

Figure 1:
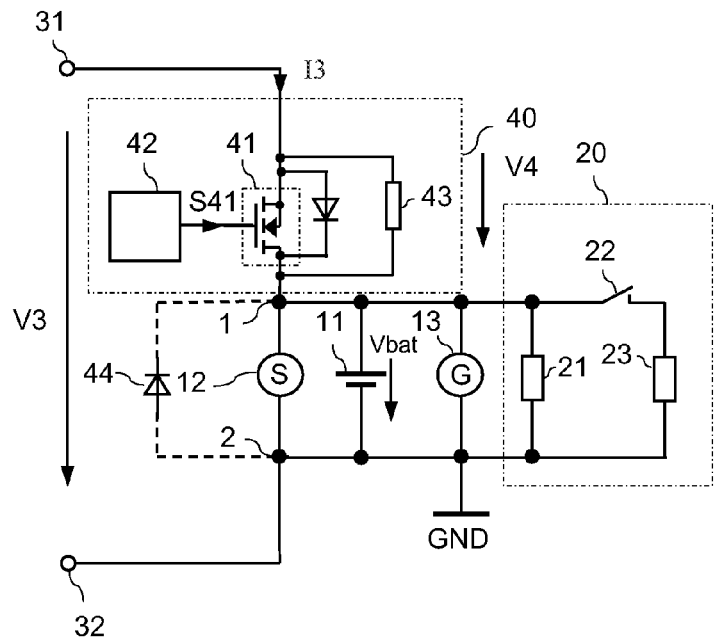
FIG. 1 schematically illustrates a first embodiment of an on-board power supply system including a reverse polarity protection unit.

FIG. 1 schematically illustrates a first embodiment of an on-board power supply system, like an automotive on-board power supply system. The power supply system includes first and second power supply terminals 1, 2 configured to have at least one of a battery 11 and a generator 13 connected thereto. In the embodiment illustrated in FIG. 1, both a battery 11 and a generator 13 are connected to the power supply terminals 1, 2. However, this is only an example. There may be on-board power supply systems or there may be operating scenarios of on-board power supply systems in which one of the battery 11 and the generator 13 is not available or is missing, respectively. The battery 11 can be a conventional automotive battery providing a supply voltage Vbat of 12V or, in modern cars, of 24V, 42V or 48V. The generator 13 can be a conventional generator driven by the internal combustion machine (not shown) and providing a supply voltage when driven by the internal combustion machine. The generator 13 can be a stand-alone generator or can be combined with a starter (starter-generator).

A plurality of loads can be connected to the power supply terminals 1, 2. These loads include a starter 12 connected between the power supply terminals 1, 2 and a load arrangement 20 with a plurality of further electrical loads. These loads may include: electric window lifts; electric seat adjustments; a media device, like a radio, a CD or DVD player; internal and external lighting; a car navigation system; and safety devices, like ABS, airbags or seat-belt tensioners. The load arrangement 20 may include loads which are permanently connected to the power supply terminals 1, 2. These loads are commonly represented by load 21 illustrated in FIG.

1. The load arrangement 20 may further include loads which are only connected to the power supply terminals 1, 2 when the ignition key of the car has been turned on, which means when the ignition lock has been activated. In FIG. 1, these loads are represented by load 23. The ignition lock is represented by a switching element 22 connected between the load 23 and the power supply terminals 1, 2.

The on-board power supply system further includes first and second external terminals 31, 32, wherein a first external terminal 31 is coupled to the first power supply terminal 1, and a second external terminal 32 is coupled to the second power supply terminal 2. Power supply terminals 1, 2 are, for example, formed by battery terminals (posts) of the battery 11. In modern cars the battery can be mounted at a location which is not or which is only difficult to access, like, for example, under the rear seat. The external terminals 31, 32 are located remote from the battery and are connected to the power supply terminals 1, 2 or the battery terminals, respectively, through electrically connecting lines. These external terminals 31, 32 allow to connect an external power source to the on-board power supply system or allow to connect an external electrical load to the on-board power supply system.

An external power supply to be connected to the external terminals 31, 32 is, for example, a battery charger for charging the car battery 11 or is, for example, a battery of another car. The battery of another car is, for example, connected to the on-board power supply system when the car's own battery 11 is empty so that jump start or assist start is required. An external load connected to the externals 31, 32 can be the on-board power supply system of another car to which jump start is to be provided, or can be one of a plurality of different loads that can be powered by automotive on-board power supply systems, like a winch, a compressor, a lamp, etc.

While it is almost impossible to connect the car battery 11 with a reverse polarity to the power supply terminals 1, 2 of the on-board power supply system, there is the risk that a user connects an external voltage source, like a battery charger or a battery of another car, with a reverse polarity to the external terminals 1, 2. Most of the electrical loads connected to an on-board power supply system require a supply voltage with a given polarity. In order to protect these loads from being damaged these loads must not have the polarity of their supply voltages reversed. Further, a generator, like generator 13 of FIG. 1, usually includes an internal rectifier arrangement (not shown) which is capable of blocking a supply voltage between the power supply terminals 1, 2 with a first polarity, but which would allow a current to flow when a supply voltage with a second polarity—a reverse polarity relative to the first polarity—would be applied between the power supply terminals 1, 2.

Since the application of an external supply voltage with a reverse polarity between the external terminals 31, 32 cannot be prevented, it should be prevented that this supply voltage is applied to the power supply terminals 1, 2 of the on-board power supply system. For this purpose, the on-board power supply system of FIG. 1 includes a reverse polarity protection unit 40 connected between the first external terminal 31 and the first power supply terminal 1. It should be noted, that the protection unit 40 could also be connected between the second power supply terminal 2 and the second external terminal 32, or that two protection units could be provided: a first one between the first external terminal 31 and the first power supply terminal 1, and a second one between the second power supply terminal 2 and the second external terminal 32.

The protection unit 40 includes a semiconductor switching unit 41 having a load path and a control terminal, wherein the load path of the semiconductor switching unit 41 is connected between the first external terminal 31 and the first power supply terminal 1. The protection unit 40 further includes a control circuit 42 coupled to the control terminal of the semiconductor switching unit 41. The control circuit is configured to switch the semiconductor switching unit 41 on and off dependent on at least one electrical parameter of the on-board power supply system. This will be explained in further detail hereinbelow.

The semiconductor switching unit 41 can be implemented with at least one transistor. In FIG. 1, this transistor is implemented as an n-type MOSFET having its source terminal connected to the first external terminal 31 and having its drain terminal connected to the first power supply terminal 1. However, implementing the semiconductor switching unit 41 with an n-type MOSFET is only an example. Any other type of semiconductor switching element, like a p-type MOSFET, an IGBT (Insulated Gate Bipolar Transistor), or a BJT (Bipolar Junction Transistor) can be used as well. A p-type MOSFET in the semiconductor switching unit 41 would have its drain terminal connected to the first external terminal 31, and would have its source terminal connected to the first power supply terminal 1.

Figure 2:
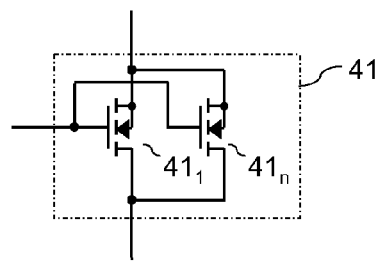
FIG. 2 illustrates an embodiment of a semiconductor switching unit of the protection unit.

The semiconductor switching unit 41 can be implemented with one transistor. However, referring to FIG. 2, it is also possible to implement the semiconductor switching unit 41 with a plurality of two or more transistors $41_1$, $41_n$ having their load paths connected in parallel. In FIG. 2, these transistors are implemented as n-type transistors. However, any other type of transistor can be used as well.

The semiconductor switching unit 41 can be switched on and off by the control circuit 42 via a control or drive signal S41. When the semiconductor switching unit 41 is switched on, the power supply terminals 1, 2 of the on-board power supply system are electrically connected to the external terminals 31, 32. In this case, a current I3 can be supplied to the on-board power supply system via the external terminals 31, 32, or a current can be supplied by the on-board power supply system to the external terminals 31, 32. In the first case, the current I3 flows in the direction as illustrated in FIG. 1, while in the second case the current flows in the opposite direction.

The control circuit 42 is configured to switch the semiconductor switching unit 41 off when an external voltage V3 is supplied between the external terminals 31, 32 which has a reverse polarity compared with the required polarity of the supply voltage of the on-board power supply system. In the embodiment of FIG. 1, the supply voltage of the on-board power supply system is the voltage Vbat provided by the battery and/or the generator. In FIG. 1, the first power supply terminal 1 of the on-board power supply system is a positive supply terminal, while the second supply terminal 2 is a negative supply terminal or reference terminal. In FIG. 1, the second power supply terminal 2 is connected to ground of the automobile in which the on-board power supply system is implemented. The external voltage V3 has a reverse polarity when the external voltage V3 is a negative voltage between the first and second external terminals 31, 32.

The control circuit 42 is configured to evaluate at least one electrical parameter in the on-board power supply system in order to detect a reverse polarity of an external voltage V3, wherein the semiconductor switching unit 41 is switched off in order to protect the on-board power supply system when a reverse polarity is detected.

According to one embodiment, the control circuit 42 is configured to only evaluate a first voltage V3 which is the external voltage between the first and second external terminals 31, 32, and to switch the semiconductor switching unit off when this voltage is a negative voltage.

Figure 3:
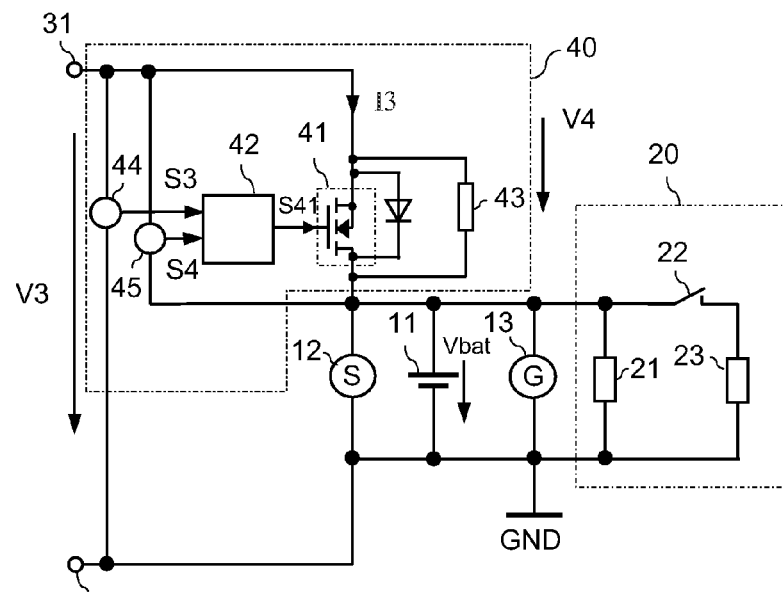
FIG. 3 illustrates a second embodiment of an on-board power supply system.

According to another embodiment illustrated in FIG. 3, the control circuit 42 is configured to evaluate a first voltage V3 which is the external voltage between the first and second external terminals 31, 32, and to evaluate a second voltage V4 which is the voltage between the first external terminal 31 and the first power supply terminal 1. The second voltage V4 corresponds to the voltage across the load path of the semiconductor switching unit 41. Referring to FIG. 3, the protection unit 40 includes a first voltage measurement unit 44 configured to measure the first voltage V3 and to provide a first voltage measurement signal S3 to the control circuit 42. The first voltage measurement signal S3 is representative of the first voltage V3. According to one embodiment, the first voltage measurement signal S3 is proportional to the first voltage V3. The protection unit 40 further includes a second voltage measurement unit 45 which is configured to measure the second voltage V4 and to provide a second voltage measurement signal S4 to the control circuit 42. The second voltage measurement signal S4 is representative of the second voltage V4. According to one embodiment, the second voltage measurement signal S4 is proportional to the second voltage V4. The first and second voltage measurement units 44, 45 can be implemented as conventional voltage measurement units. Such voltage measurement units are commonly known, so that no further explanations are required in this regard.

The operating principle of a first embodiment of the control circuit 42 of FIG. 3 will now be explained with reference to FIG. 4. In this embodiment, the control circuit 42 is configured to switch the semiconductor switching unit 41 on when the first voltage V3 is higher than a first threshold value $V3_{TH}$ and when the second voltage V4 is outside a given first voltage range which ranges from a first voltage value $V4_{TH1}$ to a second voltage value $V4_{TH2}$. The first threshold value $V3_{TH}$ is, for example, below zero. According to one embodiment, the first threshold value $V3_{TH}$ is selected from a voltage range ranging from about −5 V to about −0.05 V, in particular ranging from about −2 V to about −0.5 V. The external voltage V3 may approach zero value when a low-ohmic external load, such as a lamp, is connected to the external terminals 31, 32 and when the protection unit 40 is switched off. When the protection unit 40 then switches on, the load will be supplied by the battery 11.

The first voltage value $V4_{TH1}$ is, for example, selected from a voltage of between about −5 V and about −0.05 V, and the second voltage value $V4_{TH2}$, which together with the first voltage value defines the first voltage range, is, for example, selected from a voltage of between about 0.05 V and about 1 V. According to one embodiment, the first voltage range is symmetrically relative to zero (0V), but the first voltage range could also be asymmetrical.

Figure 4:
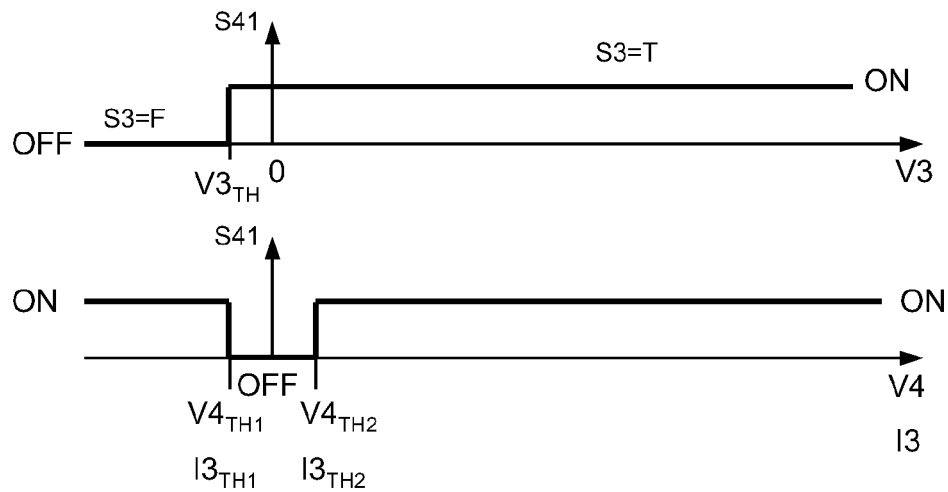
FIG. 4 illustrates the operating principle of a reverse polarity protection unit according to a first embodiment.
Figure 5:
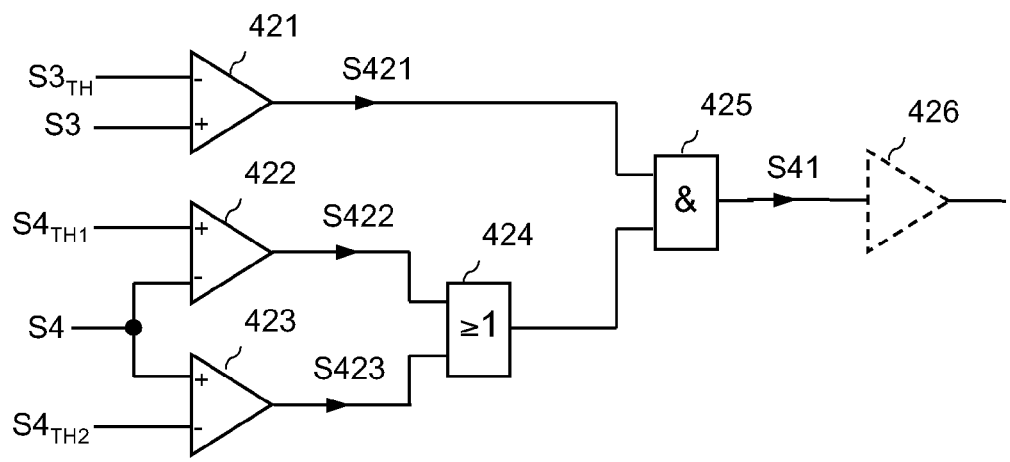
FIG. 5 illustrates a first embodiment of a control circuit of the protection unit.

An embodiment of a control circuit 42 having a functionality as illustrated in FIG. 4, is schematically illustrated in FIG. 5. This control circuit 42 includes three comparators: a first comparator 421 for comparing the first voltage measurement signal S3 with a first threshold signal $S3_{TH}$ representing the first threshold value $V3_{TH}$; a second comparator 422 for comparing the second voltage measurement signal S4 with a first signal value $S4_{TH1}$ representing the first voltage value $V4_{TH1}$; and a third comparator 423 for comparing the second voltage measurement signal S4 with a second signal value $S4_{TH2}$ representing the second voltage value $V4_{TH2}$. In the control circuit 42 of FIG. 5, the drive signal S41 is available at an output of a first logic gate 425, which is an AND-gate in this case. Optionally, the output signal S41 of the logic gate 425 is amplified using an amplifier or driver stage 426 in order to provide the drive signal for the semiconductor switching unit 41. The drive signal S41 may assume one of two different signal levels: an on-level at which the semiconductor switching unit 41 is switched on; and an off-level at which the semiconductor switching unit 41 is switched off. For explanation purposes it may be assumed that in the control circuit 42 in FIG. 5 an on-level is a high signal level and that an off-level is a low signal level. In this control circuit 42 the drive signal S41 assumes an on-level, when a comparator signal S421 of the first comparator 421 and when one of the comparator signals S422, S423 of the second and third comparators 422, 423 have an on-level. In this case, the first voltage V3 is above the threshold value $V3_{TH}$, and the second voltage V4 is outside the voltage range defined by the first and second voltage values $V4_{TH1}$, $V4_{TH2}$. The AND-gate 425 receives the first comparator signal S421 at a first input terminal. The second and third comparator signals S422, S423 are OR-connected by an OR-gate 424 wherein an output signal of the OR-gate 424 is received at a second input terminal of the AND-gate 425.

It should be noted that the control circuit 42 illustrated in FIG. 5 represents only one of a plurality of different ways in which a control circuit having a functionality as illustrated in FIG. 4 can be implemented. To evaluate the first and second voltages V3, V4 in order to decide whether or not the semiconductor switching unit 41 is switched on has the following effects: the on-board power supply system is protected from having an external voltage V3 with a reverse polarity connected thereto, because the semiconductor switching unit 41 is switched off when the external voltage V3 is below the threshold voltage $V3_{TH}$; the switching unit 41 is also switched off when the voltage between the external terminals 31, 32 is only slightly different from the internal supply voltage Vbat between the power supply terminals 1, 2. In this case, the second voltage V4 would be within the first voltage range defined by the first and second voltage values $V4_{TH1}$, $V4_{TH2}$. When the second voltage is within the first voltage range it can be assumed that the first and second external terminals are floating, which means that there is no external device connected to the external terminals.

The operating principle of the protection unit 40 explained with reference to FIGS. 2 to 5 will be better understood with reference to FIGS. 6 to 8 in which different operating scenarios are illustrated. In these Figures, the protection unit 40 is only illustrated as a circuit block.

Figure 6:
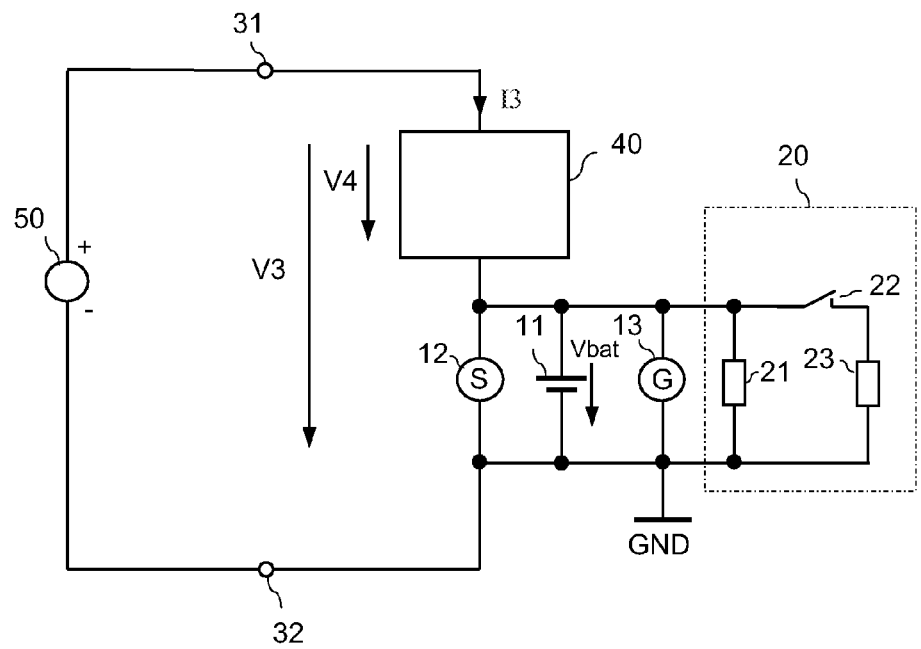
FIG. 6 illustrates a first operating scenario in which an external power source is correctly connected to the on-board power supply system.

FIG. 6 illustrates a first operating scenario in which an external voltage source 50 is connected between the first and second external terminals 31, 32. In this scenario the external voltage source has the correct polarity, so that the voltage V3 between the external terminals 31, 32 is a positive voltage. The external voltage source 50 can be a battery charger, or can be a battery of another car. In this operating scenario the protection unit 40 turns on, i.e., switches the semiconductor switching unit 41 (see FIGS. 1 and 3) on, when the external voltage V3 exceeds the internal power supply voltage Vbat for more than the second voltage value $V4_{TH2}$.

Figure 7:
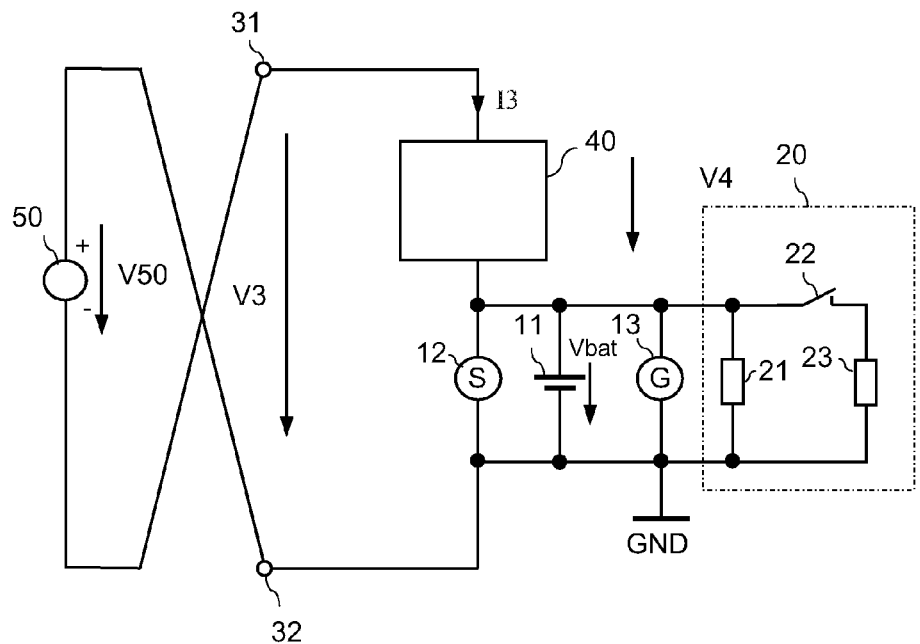
FIG. 7 illustrates a second operating scenario in which an external power source is connected to the on-board power supply system with a reverse polarity.
Figure 8:
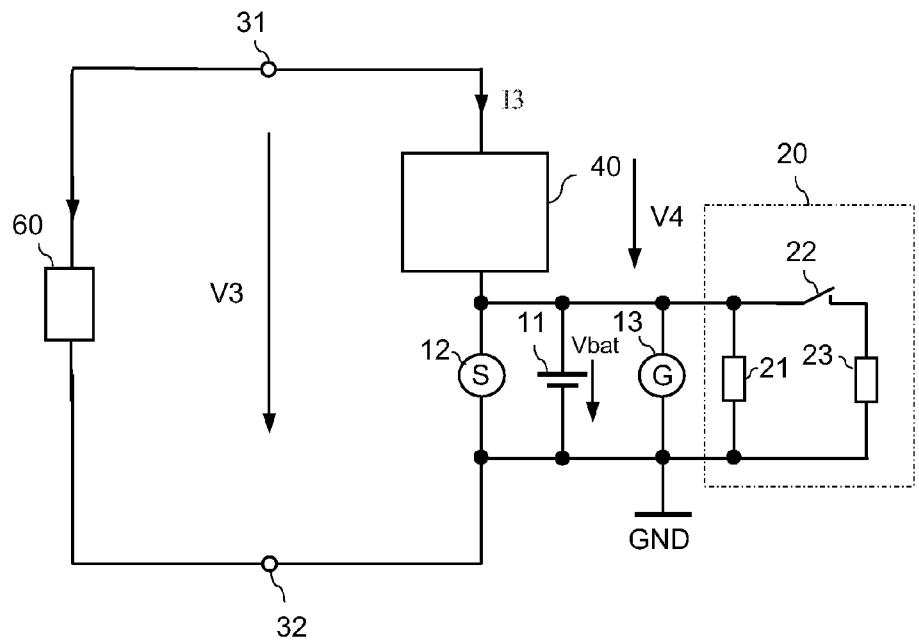
FIG. 8 illustrates a third operating scenario in which an external load is connected to the on-board power supply system.

FIG. 7 illustrates a further operating scenario in which an external voltage source 50 is connected to the external terminals 31, 32. In this scenario the external voltage source 50 is connected to the external terminals 31, 32 with a reverse polarity, so that the external voltage V3 equals the negative value −V50 of the supply voltage V50 provided by the external source 50. Assume that the absolute value of the supply voltage V50 of the external source 50 is higher than the absolute value of the first threshold value $V3_{TH}$, so that in this scenario the protection unit 40 is off, i.e., has its semiconductor switching unit 41 switched off. FIG. 8 illustrates an operating scenario in which an external load 60 is connected to the external terminals 31, 32. The load 60 is represented as an impedance in FIG. 8. However, the load could also include a voltage source. The load 60 is, for example, an on-board power supply system of another car to which jump start is to be provided, but could also be any other kind of load which could be connected to the on-board power supply system of a car. When the external load 60 is connected to the external terminals 31, 32, the electrical potential of the first external terminal 31 is either drawn to ground GND or to the electrical potential of an internal voltage source (not shown) in the load 60. This causes a negative second voltage V4 across the protection unit 40, while the first voltage V3 is zero or positive. The protection unit 40 turns on when the absolute value of the voltage drop V4 across the protection unit 40 is higher than the first voltage value $V4_{TH1}$. Thus, the protection unit 40 does not only protect the on-board power supply system from having a supply voltage with a reverse polarity connected thereto, but also allows to provide jump start to another car or to supply some external load connected to the external terminals 31, 32.

According to one embodiment, the semiconductor switching unit 41 of the protection unit 40 is configured to have a high current-carrying capacity in order to protect the semiconductor switching unit 41 from being damaged when a short-circuit in the external load 60 (see FIG. 8) occurs. The current-carrying capacity is, for example, selected such that it allows to discharge the car's own battery 11 without damaging or destroying the protection unit 40. According to one embodiment the current-carrying capacity of the semiconductor switching unit 41 is 1000 A for 10 seconds or 500 A for 1 minute.

When the semiconductor switching unit 41 (see FIGS. 1 and 3) is implemented with at least one n-type MOSFET or at least one p-type MOSFET there is a diode present between the first external terminal 31 and the first power supply terminal 1, with the anode of the diode coupled to the first external terminal 31 and the cathode of the diode coupled to the first power supply terminal 1. This diode is the internal body diode of a MOSFET, in particular a power MOSFET. This body diode is also illustrated in the protection unit 40 of FIGS. 1 and 3. The body diode conducts when an external voltage V3 is applied between the first and second external terminals 31, 32, and when this external voltage V3 is higher than the internal voltage Vbat for more than the forward voltage of the body diode. By virtue of the presence of this body diode it would not be necessary to switch the semiconductor switching unit 41 on when an external voltage source is correctly connected to the external terminals 31, 32, like in the operating scenario illustrated in FIG. 6. However, electric losses that occur in a MOSFET which is in its on-state are lower than losses which occur in the forward-biased body diode, so that it is advantageous in terms of reducing power losses to switch the semiconductor switching unit on also when a positive supply voltage is supplied to the external terminals 31, 32.

Figure 9:
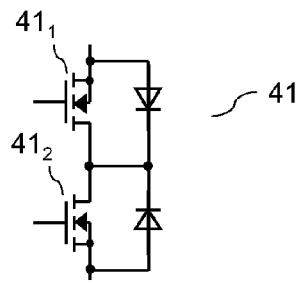
FIG. 9 illustrates a further embodiment of a semiconductor switching unit of the protection unit.

According to a further embodiment which is illustrated in FIG. 9, the semiconductor switching unit 41 is implemented with two MOSFETs $41_1$, $41_2$ connected in series. In the embodiment of FIG. 9, these MOSFETs are n-type MOSFETs which have their drain terminals connected together. However, it would also be possible to connect these MOSFETs $41_1$, $41_2$ such that they have their source terminals connected together. Further, p-type MOSFETs instead of n-type MOSFETs could be used. The arrangement with the two MOSFETs $41_1$, $41_2$ can block positive and negative voltages across the protection unit 40. The two MOSFETs $41_1$, $41_2$ are switched on and off by the control circuit (not shown in FIG. 9) simultaneously. For this, a common control or drive signal S41 may be provided to the two MOSFETs $41_1$, $41_2$. Alternatively, separate drive signals are generated by the control circuit 42 and provided to the individual MOSFETs $41_1$, $41_2$.

Figure 10:
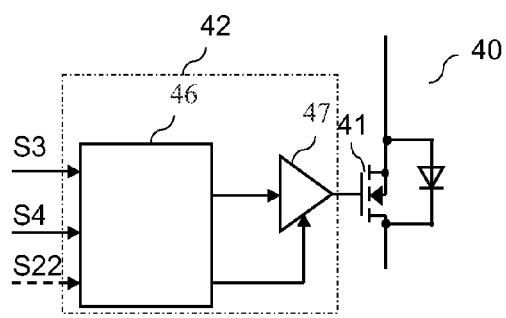
FIG. 10 illustrates an embodiment of a control circuit of the reverse polarity protection unit.

FIG. 10 schematically illustrates a further embodiment of the control circuit 42. In this embodiment, the control circuit 42 includes a logic unit 46 and a drive unit 47. In this control circuit 42 logic unit 46 generates the drive signal S41—which is amplified by the driver stage 47—dependent on the first and second voltage measurement signals S3, S4. The logic unit 46 may include a logic circuit which corresponds to the logic circuit illustrated in FIG. 5. Further, the driver stage 47 can be activated and deactivated by the logic unit 46. The logic unit 46 is configured to deactivate the driver stage 47 when or after the drive signal S41 assumes an off-level, and activates the driver stage 47 when or before the drive signal S41 assumes an on-level. The semiconductor switching unit 41 includes at least one transistor which is a normally-off transistor, so that the switched off semiconductor switching unit 41 remains in its off-state when the driver stage 47 is deactivated. By deactivating the driver stage 47, the power consumption of the protection unit 40 can be reduced. A low power consumption is in particular relevant when the car is parked and the battery is not charged.

According to a further embodiment the logic unit 46 is not only configured to activate or deactivate the driver stage 47 dependent on the first and second voltage measurement signals S3, S4, but also dependent on an ignition signal S22. The ignition signal S22 represents a switching state of the ignition lock which is represented by switch 22 in the figures explained hereinbefore.

Figure 11:
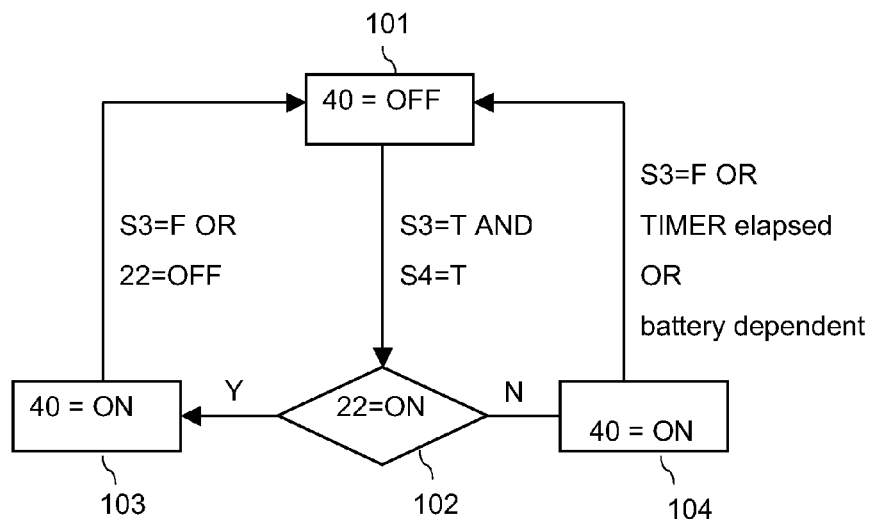
FIG. 11 illustrates the operating principle of the protection unit according to a further embodiment.

The operating principle of the control circuit 42 of FIG. 10 will be explained with reference to FIG. 11 in which a state diagram is illustrated. The state diagram illustrates different operating states the protection unit 40 can assume. In a first state 101 the protection unit 40 is turned off, which means that the semiconductor switching unit 41 is switched off and that the driver stage is deactivated. The protection unit 40 enters a second state 102 when the first and second voltage measurement signals S3, S4 indicate that the first voltage V3 is higher than the threshold value $V3_{TH}$ and that the second voltage V4 is outside the voltage range defined by the first and second voltage values $V4_{TH1}$, $V4_{TH2}$. This is indicated by S3=T and S4=T in FIG. 11. In this second state 102 the ignition signal S22 is evaluated. When the ignition signal S22 indicates that the ignition lock has been activated (the ignition key has been turned on) the protection unit 40 is turned on in a third state 103. The protection unit 40 is kept in this on-state 103 until either the first voltage V3 falls below the threshold value $V3_{TH}$, which is indicated by S3=F in FIG. 11, or until the ignition lock is deactivated, which is indicated by 22=OFF. The sequence 101-102-103-101 of states is a typical sequence which may occur when jump start is received by the car, jump start is provided to another car or when an external load is supplied when the car is in operation, i.e., when the ignition key has been turned on.

When it is determined in step 102 that the ignition lock is deactivated then the protection unit 40 is activated in state 104. The protection unit 40 leaves the on-state 104 to the off-state 101 when either the first voltage V3 falls below the threshold value $V3_{TH}$ or when an internal timer which is activated when the protection unit 40 is turned on in state 104 has elapsed. The timer is, for example, set to a time period of several minutes up to several hours. The sequence 101-102-104-101 is a typical sequence when the on-board power supply system is connected to an external voltage source, like a battery charger, or to an external load, when the car is not in operation. In this case, the timer prevents that the protection unit is kept in its on-state—in which it consumes power—for a very long time during car parking. When there is still an operating condition which requires the protection unit to be turned on after it has been turned off induced by the timer, it is again turned on until the timer again elapses.

In most cars there is a battery sensor (not shown in the drawings) coupled to the battery 11. This battery sensor provides information on the state of charge (SOC) of the battery 11 and/or on the current flowing into or out of the battery and/or the state of health (SOH) and/or the state of function (SOF) of the battery. According to one embodiment, additionally or alternatively to turning off the protection unit 40 dependent on a timer, the protection unit is turned off (transitions from state 104 to state 101) dependent on battery parameters.

The protection unit 40 is, for example, switched off when a state of charge (SOC) of the battery falls below a given threshold, such as 50% of its capacity. This prevents the battery 11 from being unduly discharged by an external load. In this case, the protection unit 40 can only be switched on again for further supplying the load, when this is be confirmed by a user, for example, by turning on the ignition key. Thus, the transition from state 101 to 104 has to be locked until ignition key is turned to ON.

According to another embodiment, the protection unit 40 is switched off, when the state of charge (SOC) of the battery exceeds a given threshold, such as 90% of its capacity, and/or when a charging current falls below a given value, such as 10 mA, for a given time, such as some minutes up to several hours, or even days. In this case, the protection unit 40 is switched off when the battery is sufficiently charged.

Figure 12:
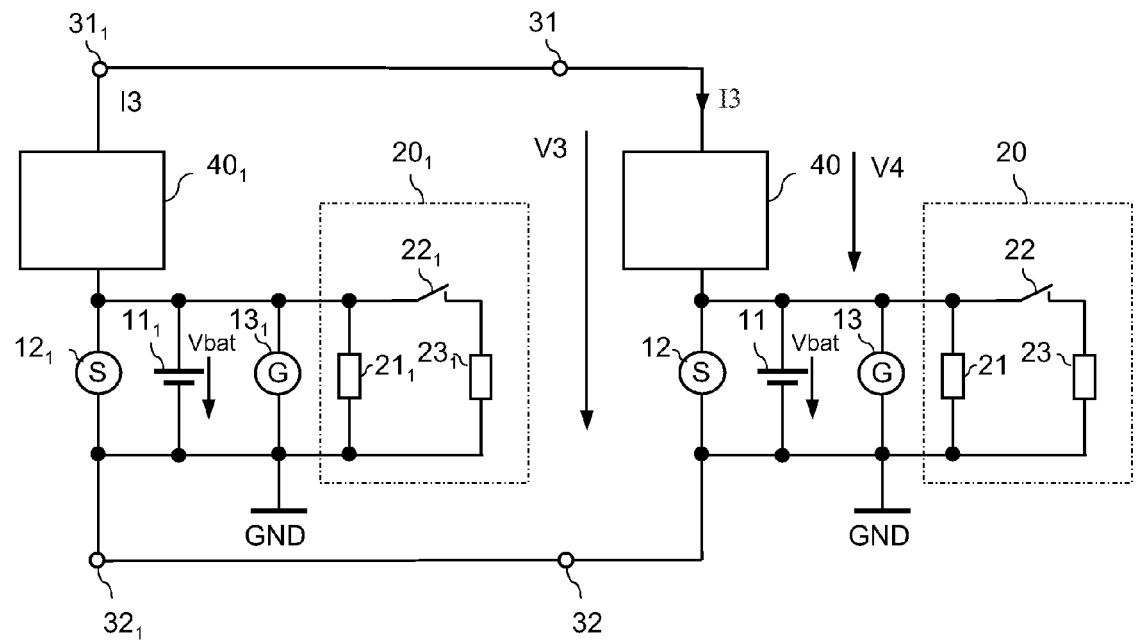
FIG. 12 schematically illustrates an arrangement in which two on-board power supply systems each having a reverse polarity protection unit have their external terminals connected with each other.

FIG. 12 illustrates an embodiment in which two on-board power supply systems, namely the on-board power supply system explained herein before and a further on-board power supply system had their external terminals connected together. In FIG. 12 like features of the second on-board power supply system have the same reference characters as the first on-board power supply system, wherein the features of the second on-board power supply system have a reference character with index "1".

Referring to FIGS. 1 and 3 an optional resistor 43 can be connected in parallel with the load path of the semiconductor switching unit 41 in the protection unit 40. This resistor 43 may help to set the potential at the first external terminal to a defined value. This is, in particular, useful when two on-board power supply systems with protection units are connected together. According to one embodiment, the resistor 43 is implemented as PTC (positive thermal coefficient) resistor. Instead of a resistor, a switching element, such as a transistor, or a transistor in series with a resistor, could be connected in parallel with the load path of the switching unit 41.

Alternatively, or additionally, to resistor 43 another resistor (not shown) can be connected between the first external terminal 31 and ground.

Further, a diode 44 can be connected in parallel with the power supply terminals 1, 12. This diode 44 may clamp reverse voltage spikes.

The semiconductor switching unit 41 and the control circuit 42 can be implemented in a common semiconductor chip or can be implemented in different semiconductor chips.

According to a further embodiment, the control circuit is configured to prevent the semiconductor switching unit 41 from being switched on when an external load (60 in FIG. 8) is connected to the external terminals. This may protect the car battery. According to one embodiment supplying an external load is prevented when the charging state of the battery 11 is low. In this case, the protection unit 40 also receives an information on the charging state of the battery from a sensor unit in order to evaluate this information.

A supply voltage of the protection unit 40, in particular of the control circuit 42 of the protection unit 40, can be provided by the car battery 11 and/or by the voltage available at the external terminals 31, 32. If both of these voltages are voltages with a reverse polarity, the protection unit 40 would not be supplied, causing the protection unit 40 to be (stay) switched off. According to one embodiment, the semiconductor switching unit includes a normally-off transistor which is switched off when the protection unit 40 is not supplied with a suitable supply voltage.

In the embodiments explained hereinbefore, the external voltage (first voltage) V3 and the voltage (second voltage) V4 across the protection unit 40 are evaluated in order to decide whether or not the protection unit is to be activated (switched on) or deactivated (switched off). According to a further embodiment, the current I3 through the protection unit 40 is evaluated instead of the second voltage. In this case, the protection unit 40 is activated when this current I3 is outside a given current range and when the first voltage is higher than the first threshold value $V3_{TH}$ (see FIG. 4). In FIG. 3, the dependency of the activation of the protection unit 40 on the current I3 is also schematically illustrated. Referring to FIG. 3, the protection unit is deactivated or switched off, when the first voltage is below the threshold and/or when the current I3 is within a given range which includes zero. This current range ranges from a first threshold current $I3_{TH1}$ to a second threshold current $I3_{TH2}$. The first threshold current $I3_{TH1}$ is, for example, between about −1 A and about −100 μA, in particular ranging from about −100 mA to about −1 mA, and the second threshold current $I3_{TH2}$ is, for example, between about 100 μA and about 1 A, in particular ranging from about 1 mA to about 100 mA. This current range can be symmetrically or asymmetrically relative to zero.

Everything which has been explained concerning an evaluation of the second voltage V4 in order to activate or deactivate the protection unit 40, applies to the evaluation of the current I3 instead of the second voltage V4 accordingly. In this connection it should be mentioned that, when the protection unit 40 is deactivated, the resistor 43 connected in parallel with the load path of the semiconductor switching unit 41 allows the current I3 to flow in the first direction illustrated in FIG. 1, and in the opposite second direction until the protection unit 40 activated. When a semiconductor switching unit 41 with at least one MOSFET is used, the body diode of the MOSFET allows the current I3 to flow in the first direction when the protection unit 40 is deactivated.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. An on-board power supply system, the system comprising:
   a first power supply terminal and a second power supply terminal configured to have a battery and/or a generator connected thereto, wherein the power supply system is configured to have a first electrical polarity applied to the first and second power supply terminals;
   a first external terminal coupled to the first power supply terminal and a second external terminal coupled to the second power supply terminal; and
   a protection unit connected between the first external terminal and the first power supply terminal,
   wherein the protection unit comprises:
      a semiconductor switching unit having a load path and a control terminal, the load path connected between the first external terminal and the first power supply terminal; and
      a control circuit coupled to the control terminal of the semiconductor switching unit and configured to switch the semiconductor switching unit on and off dependent on at least one electrical parameter in the on-board power supply system, wherein
         the control circuit is configured to turn the semiconductor switching unit off when the at least one electrical parameter indicates that an electrical polarity applied to the first and second external terminals is opposite the first electrical polarity,
         the first electrical polarity is supplied to the first and second power supply terminals and the battery and/or the generator connected thereto when the semiconductor switching unit is turned off, and
         the at least one electrical parameter comprises a first voltage between the first and second external terminals, wherein the control circuit is configured to switch the semiconductor switching unit on and off dependent on the first voltage between the external terminals and dependent on a second voltage across the protection unit.

2. The on-board power supply system of claim 1, wherein the at least one electrical parameter comprises a second voltage across the protection unit.

3. The on-board power supply system of claim 1, wherein the at least one electrical parameter comprises a current through the protection unit.

4. The on-board power supply system of claim 1 wherein the control circuit is configured to switch the semiconductor switching unit on when the first voltage is higher than a first threshold value and when the second voltage is outside a given first voltage range.

5. The on-board power supply system of claim 4, wherein the first threshold value is a voltage between about −5V and about −0.05V.

6. The on-board power supply system of claim 4, wherein the first voltage range includes zero.

7. The on-board power supply system of claim 4, wherein the first voltage range ranges from between about −5V and about −0.05V to between about 0.05V and about 1.0V.

8. The on-board power supply system of claim 4, wherein the first voltage range is symmetrical relative to zero.

9. The on-board power supply system of claim 4, wherein the first voltage range is asymmetrical relative to zero.

10. The on-board power supply system of claim 1 further comprising:
   a switch operated by an ignition switch, and wherein the control circuit is further configured to switch the switching unit on and off dependent on a switching state of the switch.

11. The on-board power supply system of claim 1, wherein the semiconductor switching unit comprises at least one semiconductor switching element.

12. The on-board power supply system of claim 11, wherein the semiconductor switching unit comprises at least two semiconductor switching elements connected in parallel.

13. The on-board power supply system of claim 11, wherein the semiconductor switching unit comprises one of an n-type MOSFET, a p-type MOSFET, an IGBT or a BJT.

14. The on-board power supply system of claim 1, wherein the protection unit further comprises a resistive element connected between the first external terminal and the first power supply terminal.

15. The on-board power supply system of claim 14, wherein the resistive element comprises an ohmic resistor, a PTC resistor, a switching element, or a constant current source.

16. The on-board power supply system of claim 14, wherein the control circuit is configured to switch the semiconductor switching unit on and off dependent on a first voltage between the external terminals and dependent on a current through the protection unit.

17. The on-board power supply system of claim 16, wherein the control circuit is configured to switch the semiconductor switching unit on when the first voltage is higher than a first threshold value and when the current through the protection unit is outside a given current range ranging from a first threshold current to a second threshold current.

18. The on-board power supply system of claim 17, wherein the first threshold current is selected from a current between about −1A and about −100μA.

19. The on-board power supply system of claim 17, wherein the second threshold current is selected from a current between about 100μA and about 1A.

20. The on-board power supply system of claim 17, wherein the current range includes zero.

21. The on-board power supply system of claim 17, wherein the current range is symmetrical relative to zero.

22. The on-board power supply system of claim 17, wherein the current range is asymmetrical relative to zero.

23. The on-board power supply system of claim 1, wherein the protection unit further comprises a diode connected between the first external terminal and the first power supply terminal.

24. A method for protecting an on-board power supply system that comprises a first power supply terminal and a second power supply terminal configured to have a battery and/or a generator connected thereto, and a first external terminal coupled to the first power supply terminal, and a second external terminal coupled to the second power supply terminal, the method comprising:
   connecting a first load between the first and second power supply terminals, wherein connecting the first load comprises applying a first polarity from the first and second power supply terminals to the first load;
   connecting a second load between the first and second external terminals;
   connecting a protection unit with a semiconductor switching unit between the first external terminal and the first power supply terminal;
   switching the semiconductor switching unit on and off dependent on at least one electrical parameter in the on-board power supply system, wherein the at least one electrical parameter comprises a first voltage between the external terminals and a second voltage across the protection unit; and maintaining the connecting between the first load and the first and second power supply terminals when the semiconductor switching unit is switched off.

25. The method of claim 24, wherein the at least one electrical parameter comprises a current through the protection unit.

26. The method of claim 24, wherein switching comprises switching the semiconductor switching unit on and off dependent on a first voltage between the external terminals and dependent on a second voltage across a load path of the semiconductor switching unit.

27. The method of claim 26, wherein switching comprises switching the semiconductor switching unit on when the first voltage is higher than a first threshold value and when the second voltage is outside a given first voltage range.

28. The method of claim 26, wherein switching comprises switching the semiconductor switching unit on and off dependent on a first voltage between the external terminals and dependent on a current through the protection unit.

29. A control circuit for a power supply protection unit, the control circuit configured to:
   receive a first voltage signal corresponding to a voltage difference between a first external terminal and a second external terminal;
   receive a second voltage signal corresponding to a voltage difference between the first external terminal and a first power supply terminal;
   detect a reverse polarity coupling between the first and second external terminals based on the first voltage signal and the second voltage signal;
   provide a control signal to a semiconductor switching unit operable to turn the semiconductor switching unit on or off dependent on the first voltage signal and the second voltage signal based on the detecting; and
   electrically disconnect the first external terminal from the first power supply terminal when the semiconductor switching unit is turned off, while an electrical connection between a power supply and a load coupled to the first power supply terminal is maintained.

30. The on-board power supply system of claim 1, wherein the control circuit is separate from the semiconductor switching unit and is configured to receive the first voltage and the second voltage.

31. An on-board power supply system, the system comprising:
   a first power supply terminal and a second power supply terminal configured to have a battery and/or a generator connected thereto, wherein the power supply system is configured to have a first electrical polarity applied to the first and second power supply terminals;
   a first external terminal coupled to the first power supply terminal and a second external terminal coupled to the second power supply terminal; and
   a protection unit connected between the first external terminal and the first power supply terminal,
   wherein the protection unit comprises:
      a semiconductor switching unit having a load path and a control terminal, the load path connected between the first external terminal and the first power supply terminal; and
      a control circuit coupled to the control terminal of the semiconductor switching unit and configured to switch the semiconductor switching unit on and off dependent on at least one electrical parameter in the on-board power supply system, wherein
         the control circuit is configured to turn the semiconductor switching unit off when the at least one electrical parameter indicates that an electrical polarity applied to the first and second external terminals is opposite the first electrical polarity,
         the first electrical polarity is supplied to the first and second power supply terminals and the battery and/or the generator connected thereto when the semiconductor switching unit is turned off, and
         the control circuit is separate from the semiconductor switching unit and is configured to receive the at least one electrical parameter.

* * * * *